May 5, 1970    W. MÜLLER ET AL    3,509,856
PIPE WALL FOR STEAM PRODUCERS
Filed July 30, 1968
Fig. 1
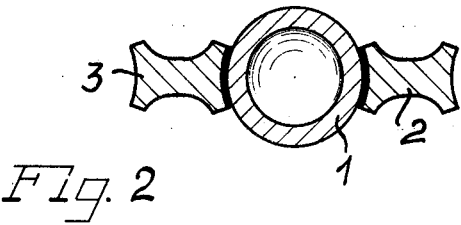
Fig. 2
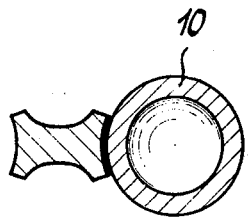
Fig. 3
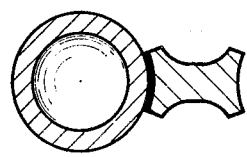
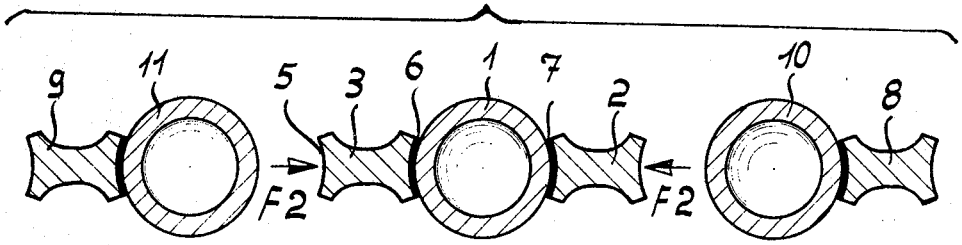
Fig. 4
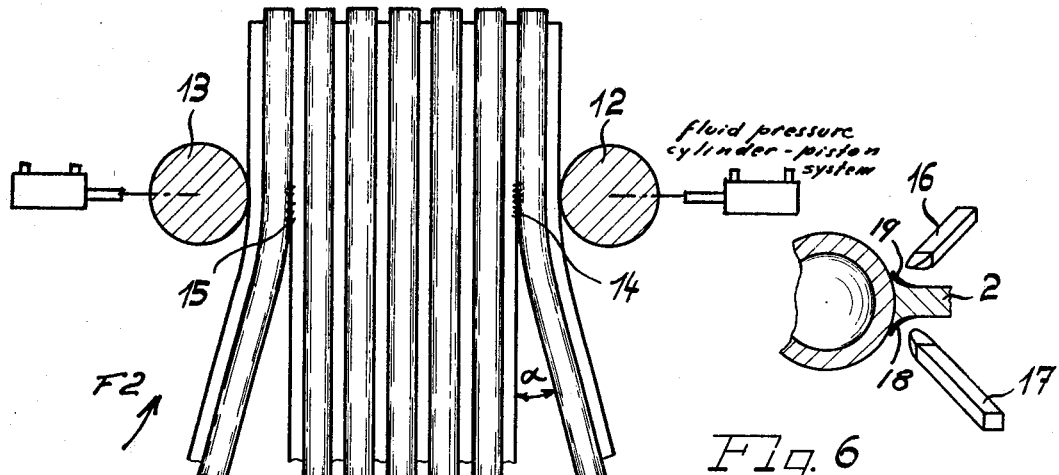
Fig. 5    Fig. 6
INVENTOR
Werner Müller
Werner Oehler
By
Walter Becker United States Patent Office 3,509,856
Patented May 5, 1970

3,509,856
PIPE WALL FOR STEAM PRODUCERS
Werner Müller and Werner Oehler, Gummersbach, Germany, assignors to L. & C. Steinmuller G.m.b.H., Gummersbach, Rhineland, Germany
Filed July 30, 1968, Ser. No. 748,868
Claims priority, application Germany, Aug. 4, 1967,
St 27,214
Int. Cl. F22b 37/20
U.S. Cl. 122—6
2 Claims

ABSTRACT OF THE DISCLOSURE

A pipe wall for steam generators, and method of making the same, according to which, starting from a single pipe with smooth outer surface, alternately fins in form of web members and pipes with smooth outer surface are fed from opposite sides and symmetrically to said first mentioned single pipe and are resistance welded together so as to build up a pipe wall.

---

The present invention relates to a pipe wall for steam producers which are composed of pipes with a smooth outer surface and of web members arranged between adjacent pipes.

Methods have become known according to which gas-tight pipe walls for steam producers can be built up of pipes with smooth outer surface and web members therebetween. For connecting the individual elements making up the pipe wall, namely the pipes and the web members, the fusion welding method, especially the under-powder and MIG welding methods, are used. However, in view of the plurality of welding seams to be drawn, these known methods do not permit a continuous production of the pipe wall. In this connection it is furthermore disadvantageous that due to the various welding planes, the fin-equipped pipe or the wall portion has to be turned when the welding operation on the upper side has been completed which fact greatly interferes with the proper flow of the production. Furthermore, there exists the possibility that the melt is influenced in different ways or that the pipes burn through when simultaneously welding together larger units by means of a plurality of welding heads (necessary in such instance) in view of different network voltages or other mechanical disturbances, as for instance in the supply of the welding wire.

It is an object of the present invention to build up a pipe wall consisting of pipes with smooth outer surface and web members welded therebetween while permitting the employment of the resistance welding method.

This object and other objects and advantages of the invention will appear more clearly from the following specification in connection with the accompanying drawing, in which:

FIG. 1 is a section through a web member to be interposed between and welded to smooth-surfaced pipes from which the pipe wall is to be built up.

FIG. 2 shows the base or central pipe with webs welded thereto from opposite sides.

FIG. 3 is a connecting pipe with a unilaterally arranged web member welded thereto.

FIG. 4 diagrammatically illustrates the building up of a pipe wall according to the invention.

FIG. 5 is the top view of a cutout of a pipe wall during a certain manufacturing phase.

FIG. 6 represents a section of a pipe with a web member welded thereto in which a free end portion of the web member at the merging area with the pipe has been machined off.

The problem underlying the present invention has been solved according to the invention by welding to a base pipe in symmetrical arrangement thereto and at opposite sides thereof web members the pipe engaging surfaces of which correspond to the outer radius of curvature of the smooth-surfaced pipes while the cross-section of said web members decreases toward the central part thereof. In conformity with the present invention, additional pipes unilaterally provided with web members are in a continuous process and to both sides of the base pipe welded to the respective adjacent pipe in conformity with the resistance welding method.

According to a further development of the invention, the pipes which are unilaterally provided with web members are by means of pressure rollers pressed against the base pipe or the respective pipes adjacent said base pipe while the rollers are displaced outwardly in conformity with the increasing width of the pipe wall.

The manufacture of pipe walls for steam generators while employing smooth pipes with web members symmetrically welded thereto and while using the resistance welding method has the advantage that the resistance welding devices which are commonly available in manufacturing plants can be used to the full extent. In addition thereto, the employment of the resistance welding method is advantageous in connection with the building up of pipe walls for steam producers inasmuch as in this way with corresponding equipment, the designer and operator is independent of the pipe dimensions and also of the pipe pitch and thereby the spacing of the pipes. The particular design of the web members arranged between the smooth-surfaced pipes has the advantage that on one hand a supporting surface adapted to the radius of curvature of the pipe is obtained which fact is of particular importance for the welding step, while on the other hand the thus resulting widening of the web members toward the free ends thereof takes care of the heat flow through the web members. With regard to the notch stresses, the specific design of the web members is also advantageous because the endwise widening of the web members creates a gradual merging with the pipe.

Referring now to the drawing in detail, the so-called base pipe 1 has both sides thereof provided with web members 2, 3 which are located symmetrically with regard to a central plane through the axis of pipe 1. The web members 2, 3 are so designed that their end faces 5 and 6 respectively correspond to the outer radius of curvature of the smooth-surfaced pipes 1, 10, 11. The webs 2, 3 taper toward the central portion thereof. For purposes of building up a pipe wall according to the invention, pipes 10, 11 fed at an angle α in the direction of the arrows F1, F2 are by means of rollers 12, 13 pressed against the base pipe 1 or the respective pipe adjacent said base pipe to which pipe web members 2, 3 have been welded so that a homogeneous structural connection is obtained in the areas which are being heated up by the welding heads 14, 15. Directly following the welding process the marginal areas 18, 19 of the web members are machined off by a machining tool 16, 17 respectively so that an absolutely notch-free merging or blending between the web members and the respective adjacent pipe is obtained.

It is, of course, to be understood that the present invention is, by no means, limited to the particular arrangement shown in the drawing but that also modifications are possible, the scope of the invention being determined by the appended claims.

It will also be understood that the angle α must be of such magnitude as to permit the introduction of the welding heads 14, 15 between the respective outer pipe wall portions and the pipe to be welded thereto.

What we claim is:
1. A pipe wall for steam generators, which comprises a plurality of pipes with a substantially smooth outer sur- face, and a plurality of web members respectively interposed between and welded to the respective adjacent pipes, oppositely located longitudinal side surfaces of each of said web members facing the respective adjacent outer surfaces of said pipes and having a radius of curvature corresponding to the radius of curvature corresponding to the radius of curvature of the outer surface of said pipes, the cross section of each of said web members decreasing from said oppositely located longitudinal side surfaces thereof to an area therebetween.

2. A pipe wall according to claim 1, in which said oppositely located side surfaces of said web members are resistance welded to the respective adjacent pipes.

References Cited

UNITED STATES PATENTS 2,660,155  11/1953  Chapman _____ 122—6

FOREIGN PATENTS 1,396,423  3/1965  France.

KENNETH W. SPRAGUE, Primary Examiner

U.S. Cl. X.R.

165—171